United States Patent [19]

Mancin

[11] 4,452,362

[45] Jun. 5, 1984

[54] WALL MOUNTED BOTTLE RACK

[76] Inventor: Rita L. Mancin, 260-65th St., Apt. 26-H, Brooklyn, N.Y. 11220

[21] Appl. No.: 273,436

[22] Filed: Jun. 15, 1981

[51] Int. Cl.³ ............................................. A47B 73/00
[52] U.S. Cl. .................................... 211/75; 248/205.2
[58] Field of Search .......................... 211/71, 74, 75; 248/205.2; 312/245

[56] References Cited

U.S. PATENT DOCUMENTS

| | | | |
|---|---|---|---|
| 342,476 | 5/1886 | Swartwout | 211/75 |
| 899,384 | 9/1908 | Colter | 211/75 |
| 1,033,583 | 7/1912 | Hart | 211/74 X |
| 1,759,390 | 5/1930 | Brandt | 211/74 |
| 2,092,691 | 9/1937 | Berghoff | 211/74 |
| 2,174,093 | 9/1939 | Perlman | 211/74 |
| 3,415,300 | 12/1968 | Worcester | 248/205 R X |
| 4,064,992 | 12/1977 | Ralston et al. | 211/75 |
| 4,115,608 | 9/1978 | Glass | 403/218 X |

FOREIGN PATENT DOCUMENTS 77613 10/1950 Norway ................................. 211/74

Primary Examiner—J. Franklin Foss
Assistant Examiner—David L. Talbott
Attorney, Agent, or Firm—Richard L. Miller

[57] ABSTRACT

A wall-mounted rack upon which a plurality of bottles of vitamins or the like are stored; the rack including a box on an outer end of each of several radial extending arms from a central hub decorated with fruits or the like.

2 Claims, 5 Drawing Figures

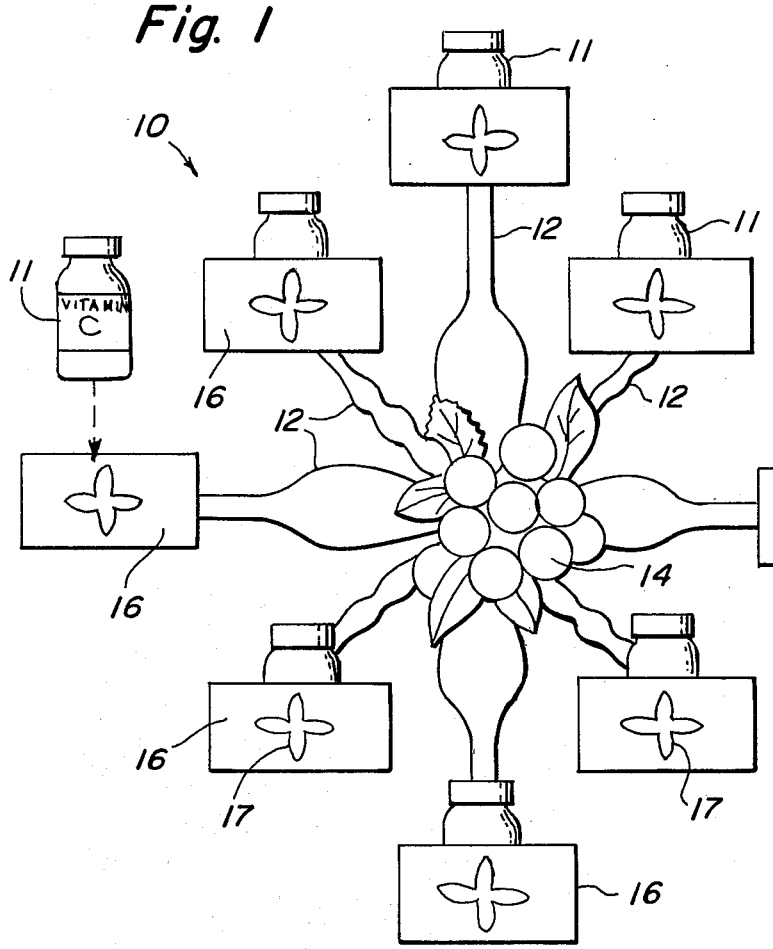
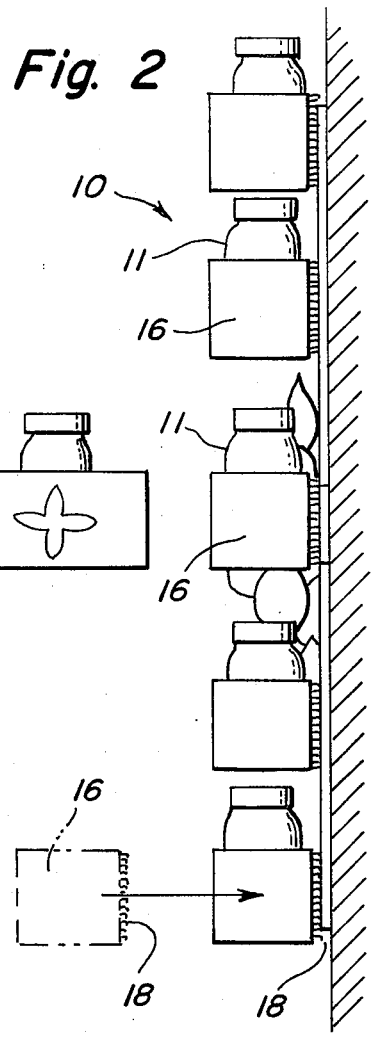
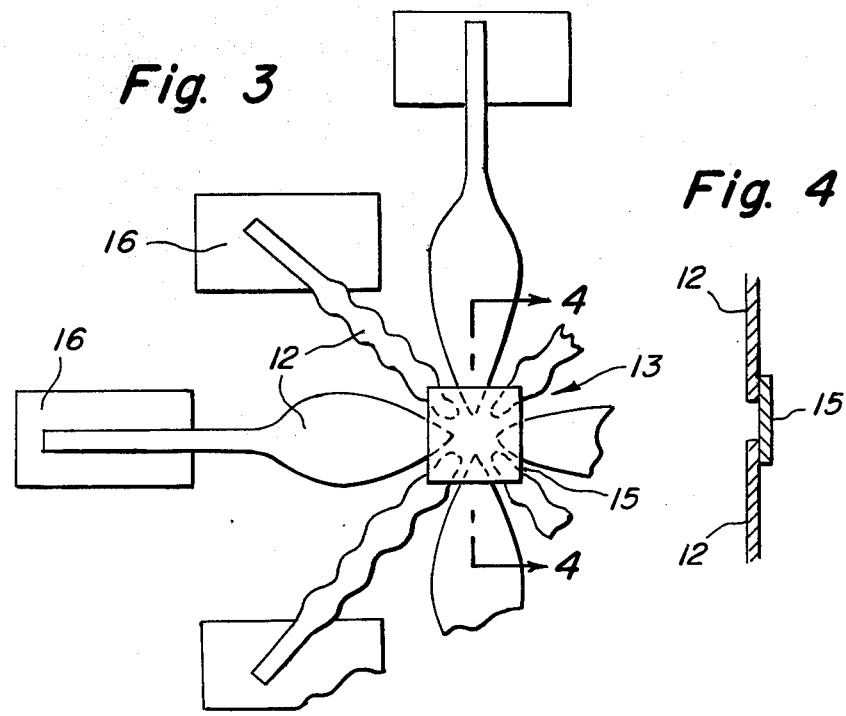
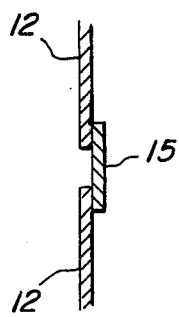
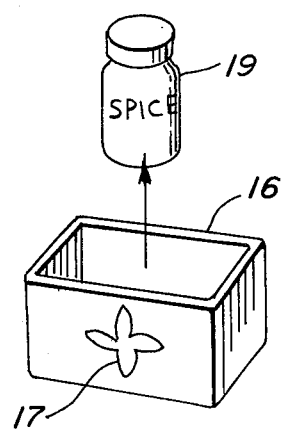

WALL MOUNTED BOTTLE RACK

This invention relates generally to racks such as are used for holding a collection of bottles or the like. More specifically it relates to wall racks.

BACKGROUND OF THE INVENTION

It is well known that numerous wall racks have been designed in the past for storing an assortment of bottles or the like, however, most such racks are made without consideration that they be additionally attractive as well, and that each of the items stored upon the rack are individually spaced away from any of the other stored items, so as to be readily and easily selected from among the others.

SUMMARY OF THE INVENTION

Accordingly, it is a principal object of the present invention to provide a wall rack for holding a plurality of like items such as a collection of bottles or other containers, and wherein the rack is attractive in appearance, and stores the items spread apart from each other so that any selected one of them may be more readily and easily located.

Another object is to provide a wall rack which additionally may include an attractive display that is associated with the nature of the plurality of items that are stored upon the rack.

Further objects of the invention will appear as the description proceeds.

To the accomplishment of the above and related objects, this invention may be embodied in the forms illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows:

FIG. 1 is a front elevational view of the invention.

FIG. 2 is a side edge view thereof shown mounted on a wall.

FIG. 3 is a fragmentary rear view thereof.

FIG. 4 is a fragmentary cross sectional view on line 4—4 of FIG. 3.

FIG. 5 is a detail perspective view of one of the boxes.

DETAILED DESCRIPTION OF THE PREFERRED EMBODIMENT

Referring now to the drawing in greater detail, the reference numeral 10 represents a Vitamin Tree according to the present invention, which comprises a wall-mounted rack upon which a set of items such as bottles, packages or other containers are removably stored in an attractive manner. In the present design of the invention, illustrated in FIGS. 1 to 4 of the drawing, a set of eight bottles 11 are stored on the rack; each bottle containing different vitamins.

The rack is shaped, having eight radially extending arms 12 from a central hub 13 which upon its front side is covered with an attractive display 14 of fruits and other growing plants so as to suggest wholesome and natural foods such as are representative of the goodness that is achieved by the eating of vitamins. Each arm comprises a flat, wooden member that is ornamentally contoured, as shown. The inward ends of the arms are secured to a flat, square, central panel 15 that forms the hub.

The outward end of each arm has a box 16 secured thereto: a top of each box being open, in order to permit placement or removal of a bottle 11 therefrom. A front side of each box may be attractively ornamented, as shown at 17. As shown in FIG. 2, each box may be adjustably secured to the arm by means of loop pile fasteners 18. The boxes and the arms are attractively painted, so that the entire assembly is pleasing to view.

In another use of the device, the set of bottles 19 serve to hold various spices, instead of vitamins, as suggested in FIG. 5. The central display 14 accordingly can comprise growing plants suggesting aromatic spices.

While certain novel features of this invention have been shown and described and are pointed out in the annexed claims, it will be understood that various omissions, substitutions and changes in the forms and details of the device illustrated and in its operation can be made by those skilled in the art with out departing from the spirit of the invention.

I claim:

1. A wall mounted bottle rack forming a circular outer shape, comprising: a vertical central hub, a plurality of arms radially extending form said hub and lying in common vertical place, a substantially similar receptacle at the distal end of each arm in which an item is removably stored, said receptacles lying in a common vertical plane, the length of each receptacle being such as to fit within vertical planes defined by the edges of the adjacent receptacles on either side thereof, said arms alternating between two radial lengths, whereby the receptacles are easily accessed without interference from other receptacles, and loop pile fasteners for removably coupling said receptacles to the distal ends of said arms and for accommodating desired angular and longitudinal orientation of the receptacles with respect to the arms.

2. A wall mounted bottle rack as in claim 1, and wherein said plurality of arms are coupled to the underside of said central hub, the forward surface of said central hub being substantially flat, and a decorative display mounted upon said forward surface of said central hub.

* * * * *